(12) United States Patent
Jang

(10) Patent No.: US 12,709,878 B2
(45) Date of Patent: Aug. 18, 2026

(54) FIRE HYDRANT VALVE USABLE ALONE QUICKLY IN CASE OF FIRE

(71) Applicant: Man Gu Jang, Incheon (KR)

(72) Inventor: Man Gu Jang, Incheon (KR)

( * ) Notice: Subject to any disclaimer, the term of this patent is extended or adjusted under 35 U.S.C. 154(b) by 9 days.

(21) Appl. No.: 18/856,613

(22) PCT Filed: Apr. 20, 2023

(86) PCT No.: PCT/KR2023/005359
§ 371 (c)(1),
(2) Date: Oct. 13, 2024

(87) PCT Pub. No.: WO2023/204619
PCT Pub. Date: Oct. 26, 2023

(65) Prior Publication Data

US 2025/0263912 A1 Aug. 21, 2025

(30) Foreign Application Priority Data

Apr. 20, 2022 (KR) ........................ 10-2022-0048712

(51) Int. Cl.
*A62C 35/20* (2006.01)
*A62C 35/68* (2006.01)
*E03B 9/02* (2006.01)
*F16K 31/60* (2006.01)

(52) U.S. Cl.
CPC ................ *E03B 9/02* (2013.01); *A62C 35/20* (2013.01); *A62C 35/68* (2013.01); *F16K 31/60* (2013.01)

(58) Field of Classification Search
CPC . E03B 9/02; A62C 35/20; A62C 35/68; F16K 31/60; F16K 31/46–465
See application file for complete search history.

(56) References Cited

U.S. PATENT DOCUMENTS 223,159 A * 12/1879 Neracher ............... A62C 35/20 137/616.7
432,906 A * 7/1890 Sholding ............... B62B 3/0612 248/90
825,570 A * 7/1906 Wirt ....................... A62C 35/20 251/349
896,995 A * 8/1908 Kates ...................... F16K 31/58 137/616.7
933,290 A * 9/1909 Clay .................. B65H 75/4478 251/351
1,255,364 A * 2/1918 Waibel ................... A62C 35/20 251/294
5,329,960 A * 7/1994 Bello ..................... A62C 33/00 251/294

FOREIGN PATENT DOCUMENTS

JP H061716 Y2 * 1/1994

* cited by examiner

*Primary Examiner* — Marina A Tietjen

(57) ABSTRACT

Disclosed herein is a fire hydrant valve (easy action valve) that is usable alone quickly in the event of fire, and more particularly, a fire hydrant valve that is usable alone quickly in the event of fire, which can be even opened from a long distance away. The fire hydrant valve includes a body formed with a first opening and a second opening, a switching unit including a rod configured to penetrate the body, and a disk provided at an end of the rod to open and close the first opening, and a first movement unit connected to the rod and a hose connected to the second opening and configured to move the rod in response to movement of the hose.

2 Claims, 10 Drawing Sheets

FIRE HYDRANT VALVE USABLE ALONE QUICKLY IN CASE OF FIRE

TECHNICAL FIELD

The present disclosure relates to a fire hydrant valve (easy action valve) that is usable alone quickly in the event of fire. More specifically, the present disclosure relates to a fire hydrant valve that is usable alone quickly in the event of fire, which enables fire-extinguishing water to be used, firstly, by pulling a fire hose from a long distance when using a fire hydrant, secondly, by pulling an open grip installed on the fire hydrant, and thirdly, by turning a handle like a globe valve.

BACKGROUND ART

A structure such as buildings is equipped with an indoor fire hydrant within the legal area thereof for rapid fire extinguishment in the event of fire.

The fire hydrant includes a valve connected to a water supply pipe and a fire hose in communication with the valve. The valve generally includes a body having a first opening in communication with the water supply pipe and a second opening connected to communicate with the fire hose, a switching unit installed in the body to open and close the first or second opening to selectively supply water from the first opening to the second opening, and so on.

Typically, an angle-type globe valve or the like has been used as the valve for the fire hydrant described above.

Korean utility model No. 20-0460451 (hereinafter, referred to as the "prior art") discloses a fire hydrant valve. More specifically, when wanting to assemble a rod 40 and a valve body 30, a first through-thread **33*a* on an upper bar 33 may be positioned in a first clearance hollow groove 40*b* of the rod 40 after passing through while engaging with a first through-groove 40*a* on the rod 40 so as to complete the assembly between them, or a second through-thread 40*c* on the rod 40 may be positioned in a second clearance hollow groove 33*c* of an upper bar 33 after passing through while engaging with a second through-groove 33*b* on the upper bar 33 so as to complete the assembly between them. As a result, it is possible to ensure productivity since there is no need for separate parts such as snap rings with the reduced length of the upper bar 33**, as well as assemblability.

However, the prior art may be left unattended and unable to function properly in the event of actual fire since it is too inconvenient to use because requiring the valve to be opened by turning the handle thereof several times.

In addition, if the valve is opened while a fire hose is placed on the side of the valve, water may be discharged and wasted during movement of the outlet of the fire hose to a long distance. In order to minimize the waste of water as such, at least two people are required to move the outlet of the fire hose to the site of fire and then to open the valve. Hence, it may not often be possible to perform this process alone and it is so inconvenient to use the fire hydrant that there are even promotional materials from the National Emergency Management Agency.

Therefore, the prior art may often lead to large-scale fires because it misses the time to put out a fire in its early stages.

DISCLOSURE

Technical Problem

The present disclosure has been made in view of the above-mentioned problems, and an object thereof is to provide a fire hydrant valve for indoor fire hydrants, which is optimized for fire extinguishment, just like easily using a fire extinguisher when anyone finds a fire.

Another object of the present disclosure is to provide a fire hydrant valve that is usable alone quickly in the event of fire by opening the valve (first opening) even at a long distance from the valve (body).

Still another object of the present disclosure is to provide a fire hydrant valve that is usable alone quickly in the event of fire by opening the valve (first opening) even near the valve (body).

A further object of the present disclosure is to provide a fire hydrant valve that is usable alone quickly in the event of fire, which can prevent its opening (first opening) from being opened unintentionally.

Technical Solution

The present disclosure aimed at solving the above problems has the following configuration and features.

In accordance with an aspect of the present disclosure, there is provided a fire hydrant valve that includes a body formed with a first opening and a second opening, a switching unit including a rod configured to penetrate the body, and a disk provided at an end of the rod to open and close the first opening, and a first movement unit connected to the rod and a hose connected to the second opening and configured to move the rod in response to movement of the hose.

The fire hydrant valve may further include second movement unit, which includes a main shaft connected to the body, a moving shaft connected to the rod and placed in front of the main shaft, a plate coupled to the main shaft to rotate about the main shaft, and a guide hole formed on the plate in a direction of rotation thereof for penetration of the moving shaft through the plate.

The first movement unit may include a first torsion spring, which includes a first coil surrounding the main shaft and a first arm connected to the plate by extending from an end of the first coil, a base connected to the body, a shaft member provided on the base, a latching member, which includes a body part placed on the base to rotate about the shaft member configured to penetrate the body part, a rear part extending to one side from the rear of the body part, a front part extending to one side from the front of the body part, and a latching groove formed by the body part, the rear part, and the front part, a latching shaft provided on the plate and inserted into the latching groove, and a second torsion spring, which includes a second coil surrounding the shaft member, a second support arm including a second straight part extending backwards from one of both ends of the second coil and a second hook part connected to the base by extending downwards from a rear end of the second straight part and configured to support a rear end of the rear part, and a second fixed arm fixed to the base by extending from the other of both ends of the second coil.

The first movement unit may include a groove formed at a front end of the body part, a tilting member, which includes a vertical part penetrating the base and a connection part connected to the hose while being connected to the bottom of the vertical part, a movable shaft provided on the base and placed forwards on the other side from the shaft member, a transmission piece, which includes a latching part placed at an upper portion of the base and positioned on one side from the vertical part, and an insertion part extending forwards from a front end of the latching part and bent or curved to one side to insert its 5 end into the groove, the movable shaft penetrating the insertion part, and a third torsion spring, which includes a third coil surrounding the movable shaft, a third support arm including a third straight part extending forwards from one of both ends of the third coil and a third hook part connected to the base by extending downwards from a rear end of the third straight part and configured to support the front of one side of the insertion part, and a third fixed arm fixed to the base by extending from the other of both ends of the third coil.

Advantageous Effects

The present disclosure has an effect of opening a valve (first opening) even at a long distance from a valve (body).

In addition, the present disclosure has an effect of opening the valve (first opening) even near the valve (body).

Furthermore, the present disclosure has an effect of preventing a valve's opening (first opening) from being opened unintentionally.

MODE FOR DISCLOSURE

Specific implementations (aspects or embodiments) will be described in detail below with reference to the accompanying drawings since the present disclosure may be subjected to various modifications and have various examples. It should be understood, however, that the present disclosure is not intended to be limited to the specific embodiments, but the present disclosure includes all modifications, equivalents or replacements that fall within the spirit and scope of the disclosure as defined in the following claims.

The terminology used herein is for the purpose of describing particular implementations (aspects or embodiments) only and is not intended to limit the present disclosure. As used herein, the singular forms "a", "an" and "the" are intended to include the plural forms as well, unless the context clearly indicates otherwise. It should be understood that the terms "comprises/includes" and/or "comprising/including", when used in the specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms used herein, including technical and scientific terms, have the same meanings as those commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The terms "first", "second", and the like described herein are only used to distinguish different components, and are not bound by the manufacturing order. The names thereof may not be consistent in the detailed description and claims of the disclosure.

In the whole specification, it will be understood that when an element is referred to as being "connected" to another element, it can be "directly connected" to the other element or it can be "indirectly connected" to the other element with other elements being interposed therebetween.

Figure 1:
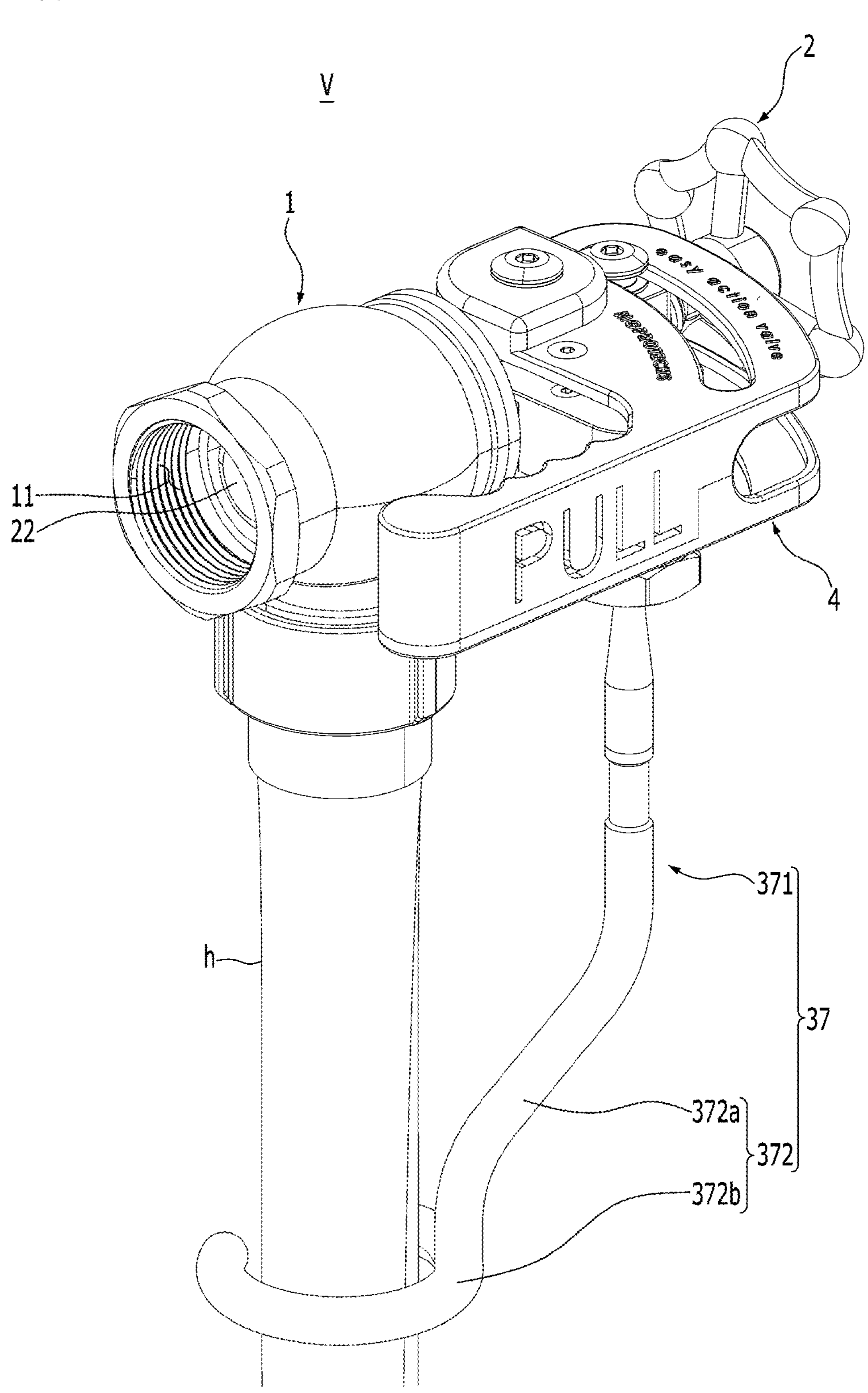
FIG. 1 is a perspective view illustrating a fire hydrant valve according to an embodiment of the present disclosure.
Figure 2:
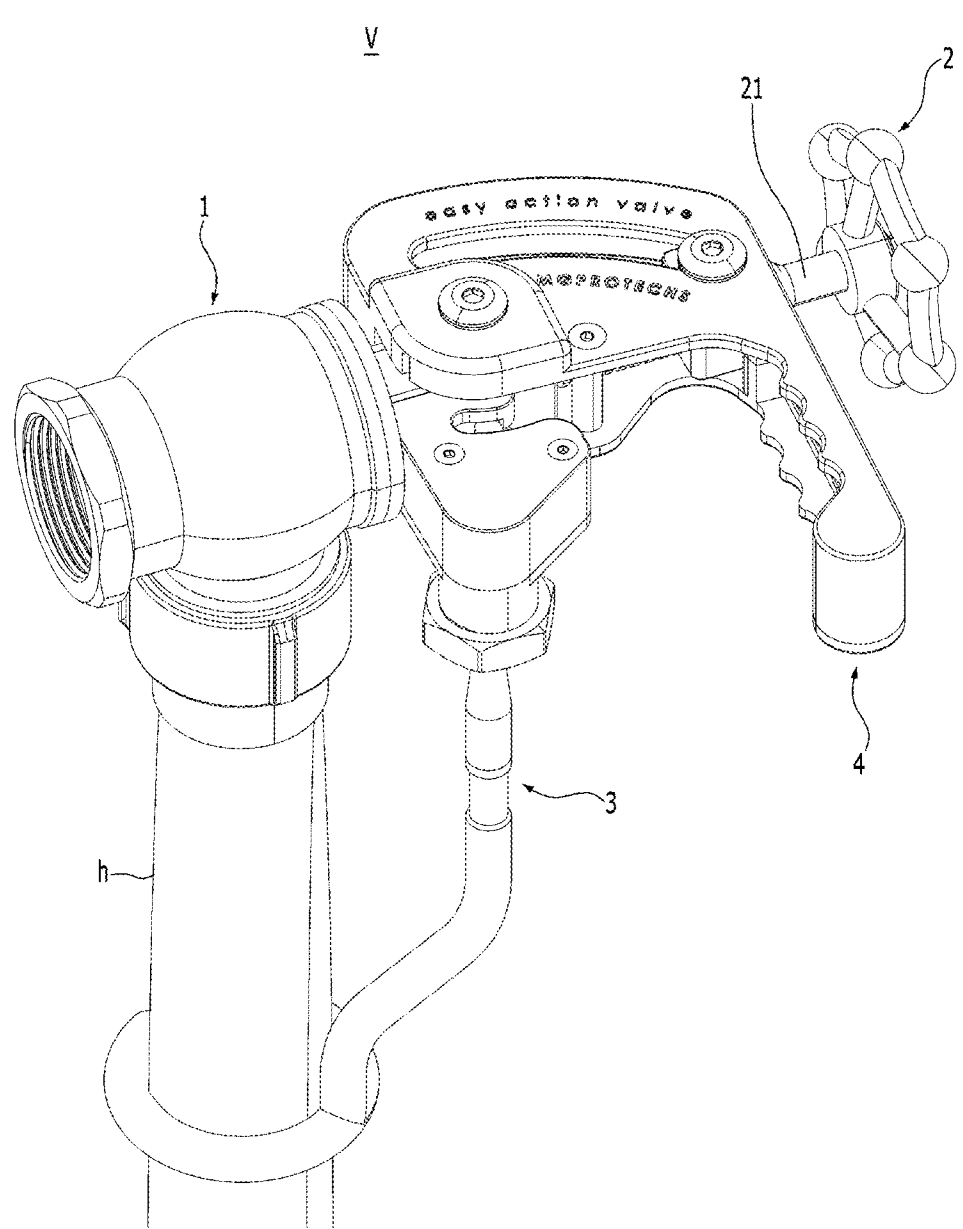
FIG. 2 is a view illustrating a state in which the valve is opened by a switching unit in FIG. 1.
Figure 3:
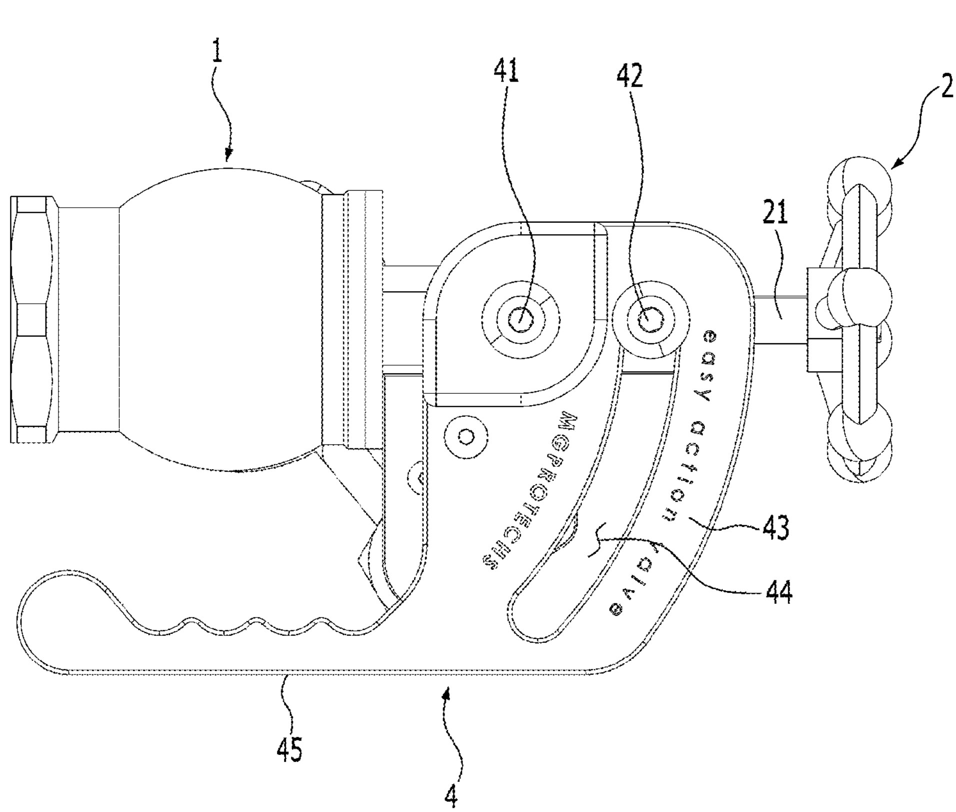
FIG. 3 is a top view of the fire hydrant valve.

FIG. 1 is a perspective view illustrating a fire hydrant valve convenient for use according to an embodiment of the present disclosure. FIG. 2 is a view illustrating a state in which the valve is opened by a switching unit in FIG. 1. FIG. 3 is a top view of the valve convenient for use.

The fire hydrant valve (easy action valve, or fire hydrant valve that is usable alone quickly in the event of fire), which is designated by reference numeral V, according to the embodiment of the present disclosure is easy to use even from a long distance away, and will be referred to as "this device" hereinafter for the convenience of explanation.

Hereinafter, the position, direction, and the like of each component (body 1, switching unit 2, first movement unit 3, second movement unit 4, etc.) of this device will be described on the basis of FIG. 3.

Referring to FIGS. 1 to 3, this device (fire hydrant valve V according to the embodiment of the present disclosure) includes a body 1, a switching unit 2, and a first movement unit 3.

The body 1 is formed with a first opening 11 and a second opening (not shown), which are in communication with a hose h to be described later. The body 1 has a space (passage) defined therein. The first opening 11, the second opening, and a third opening to be described later are in communication with each other by way of the passage.

For example, the first opening 11 is formed at the rear of the body 1, and the second opening is formed at the bottom of the body 1, so this device may be of an angle type.

Here, the rear refers to a left side in FIG. 3, and the front refers to a right side in FIG. 3. In addition, the bottom refers to a lower side in FIG. 3, and the top refers to an upper side in FIG. 3, which will be applied equally in the following description.

The body 1 may also include a third opening formed at the front thereof while communicating with the passage.

Figure 4:
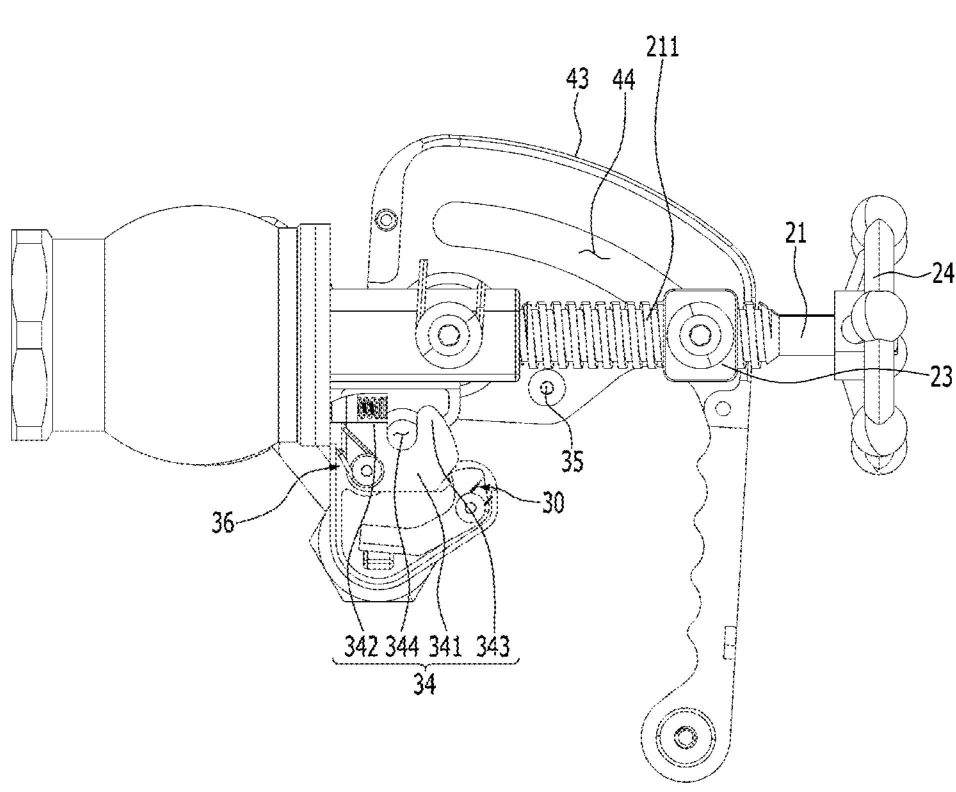
FIG. 4 is a top view illustrating a state in which an upper plate is removed from FIG. 2.

FIG. 4 is a top view illustrating a state in which an upper plate is removed from FIG. 2.

Referring to FIGS. 1, 2, and 4, the switching unit 2 includes a rod 21 that penetrates the body 1. The third opening is formed by the rod 21 of the switching unit 2 penetrating the front of the body 1. The penetration of the rod 21 through the third opening is not illustrated in the drawings.

The rod 21 may have a front-to-rear length, and may have a thread 211 formed on the outer periphery thereof.

It goes without saying that the body 1 may be provided with a gasket that seals between the body 1 and the rod 21.

The switching unit 2 includes a disk 22 provided at the end (rear end) of the rod 21 to open and close the first opening 11.

The disk 22 may have an outer diameter corresponding to the diameter of the first opening 11, so as to open and close the first opening 11 as the rod 21 moves forwards and backwards. The switching unit 2 may include a nut member 23 and a handle 24, which will be described in more detail below.

Referring to FIGS. 1 to 3, the first movement unit 3 is connected to the rod 21 and the hose h in communication with the second opening, and moves the rod 21 in response to the movement of the hose h.

Since the disk 22 is provided at the end of the rod 21, the disk 22 may open and close the first opening 11 as the rod 21 moves forwards and backwards by the first movement unit 3.

The principle of movement of the rod 21 in the forward and backward direction by the first movement unit 3 will be described in more detail below.

Referring to FIGS. 1 to 3, this device may include a second movement unit 4, which includes a main shaft 41 connected to the body 1 and having a vertical length (in a top-bottom direction in FIG. 3) and a moving shaft 42 connected to the rod 21 and placed in front of the main shaft 41.

The moving shaft 42 may also have a vertical length, just like the main shaft 41.

The main shaft 41 may be provided at the front of the body 1, be in communication with the third opening, and may be provided in a guide extending forwards from the front of the body 1, the rod 21 penetrating the guide. The guide is intended to add straightness to the rod 21 (to guide the forward and backward movement of the rod 21).

The second movement unit 4 may include a plate 43 coupled to the main shaft 41 to rotate about the main shaft 41. The plate 43 may consist of a pair of plates (upper plate and lower plate) in a vertical direction with respect to the guide, and the pair of plates 43 may be coupled to each other by means of bolts or the like.

The plate 43 may rotate centrifugally or eccentrically about the main shaft 41.

The second movement unit 4 may include a guide hole 44 formed on the plate 43 in a direction of rotation (centrifugal rotation or eccentric rotation) thereof for penetration of the moving shaft 42 through the plate 43.

It goes without saying that the second movement unit 4 may also include a grip 45 extending backwards from the rear end of the other side of the plate 43 (as described above, the arrangement position, direction, and the like of each component of this device will be described on the basis of FIG. 3).

Referring to FIGS. 3 and 4, with the disk 22 closing the first opening 11 as illustrated in FIG. 3, the plate 4 may rotate counterclockwise about the main shaft 41 (the terms "clockwise" and "counterclockwise" will be described on the basis of FIG. 3).

In this case, the guide hole 44 may also be positioned as illustrated in FIG. 4 by rotating counterclockwise about the main shaft 41.

As the guide hole 44 rotates counterclockwise in this way, the moving shaft 42, which is connected to the rod 21 and penetrates the guide hole 44, may be guided by the guide hole 44 to move forwards from FIG. 3 as illustrated in FIG. 4. Thus, the disk 22 may open the first opening 11.

On the contrary, if the plate 43 rotates clockwise, the moving shaft 42 may move backwards so that the disk 22 closes the first opening 11.

As illustrated in FIG. 4, if the disk 22 opens the first opening 11, a fluid such as water introduced through the first opening 11 may flow to the hose h via the passage and the second opening.

As such, this device has an advantage of opening and closing the first opening 11 by moving the rod 21 even at a short distance, including the second movement unit 4.

Referring to FIGS. 1 and 4, the switching unit 2 may include a nut member 23, which is screwed to the rod 21 and connected to the moving shaft 42.

The moving shaft 42 may include a shaft body penetrating the guide hole 44, and a head formed at the top or bottom of the shaft body or both thereof, the head having a larger outer diameter than the shaft and an outer diameter larger than the width of the guide hole 44.

Accordingly, the moving shaft 42 may remain penetrated into the guide hole 44. Therefore, since the nut member 23 connected to the moving shaft 42 remains fastened to the plate 43 axially coupled to the main shaft 41 fixed in position by connection to the body 1, the nut member 23 is fixed in position as long as the plate 43 is stationary without rotation.

In this case, if the rod 21 rotates about its longitudinal direction while the plate 43 does not rotate, the rod 21 may move forwards and backwards by the nut member 23 fixed in position, and the first opening 11 may thus be opened and closed only by the rotation of the rod 21.

It goes without saying that the switching unit 2 may include a handle 24 provided at the front end of the rod 21.

Figure 5:
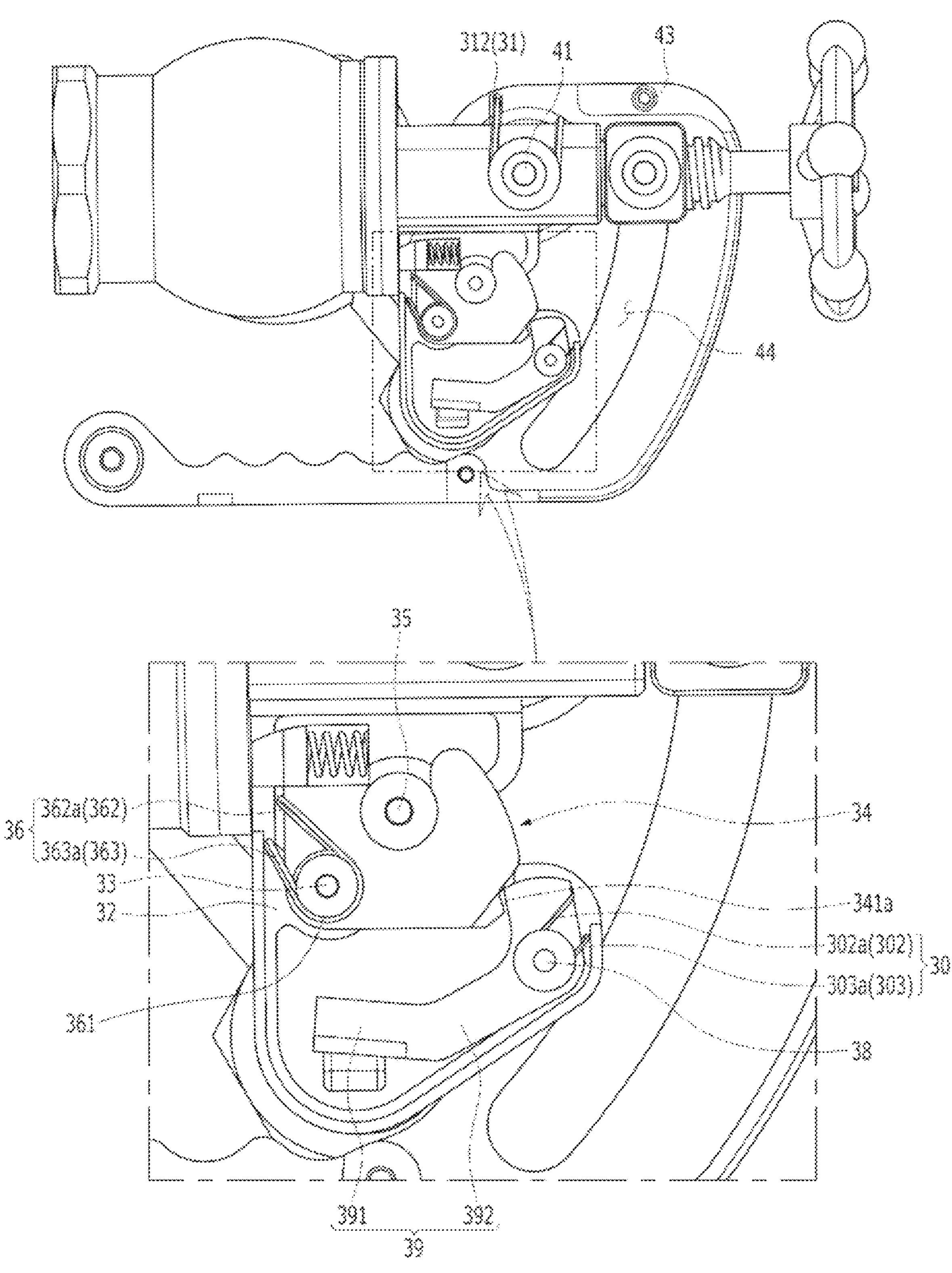
FIG. 5 is a view illustrating a state in which the upper plate is removed from FIG. 3 for explanation of first and second movement units.

FIG. 5 is a view illustrating a state in which the upper plate is removed from FIG. 3 for explanation of the first and second movement units.

Referring to FIGS. 4 and 5, the first movement unit 3 may include a first torsion spring 31, which includes a first coil (not shown) surrounding the main shaft 41 in a vertical direction and a first arm 312 connected to the plate by extending from the end of the first coil.

The first movement unit 3 may also include a base 32 connected to the body 1.

For example, the base 32 may be connected to the bottom of the guide and extend to the other side.

Here, one side refers to an upward side in FIG. 3, and the other side refers to a downward side in FIG. 3, which will be applied equally in the following description.

The first movement unit 3 may also include a shaft member 33 provided on the base 32 while having a vertical length. The shaft member 33 may be placed behind the main shaft 41.

The first movement unit 3 may also include a latching member 34, which includes a body part 341 placed on the base 32 and connected therethrough to the shaft member 33 to rotate about the shaft member 33, a rear part 342 extending to one side from the rear of the body part 341, and a front part 343 extending to one side from the front of the body part 341.

The latching member 34 may include a latching groove 344 formed by the body part 341, the rear part 342, and the front part 343.

The shaft member 33 may penetrate the rear side of the body part 341.

The first movement unit 3 may also include a latching shaft 35 provided on the plate 43 while having a vertical length. The latching shaft 35 may be inserted into the latching groove 344 (the latching shaft 35 may be inserted into the latching groove 344 while the disk 22 closes the first opening 11).

The first movement unit 3 may also include a second torsion spring 36. The second torsion spring 36 includes a second coil part 361 surrounding the shaft member 33 in a vertical direction, a second support arm 362, and a second fixed arm 363. The second support arm 362 includes a second straight part 362*a* extending backwards from one of both ends of the second coil part 361, and a second hook part extending downwards from the rear end of the second straight part 362*a* and connected to the base 32 to support the rear end of the rear part 342. The second fixed arm 363 includes a second extension part 363*a* extending backwards from the other of both ends of the second coil part 361, and a second fixed part extending downwards from the rear end of the second extension part 363*a* and fixed to the base 32.

The second fixed part may be positioned on the other side from the second hook part. The second fixed part may be spaced apart from the rear end of the latching member 34.

The rear ends of the second straight part 362*a* and the second extension part 363*a* may be inclined to one side toward the rear so that they are positioned on one side from their respective front ends.

Referring to FIG. 5, the latching shaft 35 connected to the plate 43 is inserted into the latching groove 344. The latching member 34 rotates about the shaft member 33.

As described above, the second coil of the second torsion spring 36 surrounds the shaft member 33, in which case the latching member 34 may be placed such that the front end of the front part 343 is directed forwards by means of the elastic restoring force of the second torsion spring 36 (by the second hook part supporting the rear part 342 and by its own elastic restoring force). In this case, the moving shaft 42 connected to the plate 43 may not rotate about the main shaft 41 because its movement is restricted by the front part 343, as illustrated in FIG. 5.

Accordingly, it is possible to prevent the unintentional opening of the first opening 11 by preventing the plate 43 from rotating counterclockwise about the main shaft 41 due to an unintended force.

In FIG. 5, if the plate 43 is forced to rotate counterclockwise about the main shaft 41, the front part 343 may rotate clockwise about the shaft member 33 by the force transmitted through the moving shaft 42, and the moving shaft 42 may thus rotate counterclockwise about the main shaft 41.

This allows the first opening 11 to be opened, and after the moving shaft 42 transmitting the force is released from the latching groove 344, the latching member 34 may be placed as illustrated in FIG. 4 by allowing the rear part 342 to rotate counterclockwise about the latching shaft 35 (the line of center of the latching shaft 35) by the elastic restoring force of the second torsion spring 36 (the elastic restoring force of the second hook part and the elastic restoring force of the second fixed part supported at the rear end of the latching member 34 as the latching member 34 rotates).

Referring to FIGS. 1, 4, and 5, the first movement unit 3 may include a groove 341*a* formed at the front end of the body part 341. The groove 341*a* may be provided in the form of a sloped side so as to have a width decreased toward its bottom from its opening.

The first movement unit 3 may also include a tilting member 37, which includes a vertical part 371 penetrating the base 32 and a connection part 372 connected to the hose h while being connected to the bottom of the vertical part 371.

The vertical part 371 may have a longitudinal direction parallel to the vertical direction (in FIG. 3). The protruding part (inclined part 371*ab* to be described later) protruding upwards of the base 32 from the vertical part 371 may be positioned on the other side from the latching member 34.

The first movement unit 3 may also include a movable shaft 38 provided on the base 32 and placed forwards on the other side from the shaft member 33. The movable shaft 38 may also have a vertical length.

The first movement unit 3 may also include a transmission piece 39, which includes a latching part 391 placed at the upper portion of the base 32 and positioned on one side from the other end of the top (inclined part 371*ab* to be described later, see FIG. 6) of the vertical part 371, and an insertion part 392 extending forwards from the front end of the latching part 391 and bent or curved to one side, the movable shaft 38 penetrating the insertion part 392.

Among a pair of edges of one end of the insertion part 392, one (edge) positioned at the rear of the insertion part 392 may be inserted into the groove 341*a*.

The first movement unit 3 may also include a third torsion spring 30. The third torsion spring 30 includes a third coil part (not shown) surrounding the movable shaft 38 in a vertical direction, a third support arm 302, and a third fixed arm 303. The third support arm 302 includes a third straight part 302*a* extending forwards from one of both ends of the third coil part, and a third hook part extending downwards from the rear end of the third straight part 302*a* and connected to the base 32 to support the front side of one side of the insertion part 392. The third fixed arm 303 includes a third extension part 303*a* extending backwards from the other of both ends of the third coil part, and a third fixed part extending downwards from the rear end of the third extension part 303*a* with its lower end fixed to the base 32.

The third fixed part may be positioned on one side from the third hook part, and the third fixed part may be spaced apart from one end of the transfer piece 39. Furthermore, the third straight part 302*a* may be inclined so that its front end is positioned on one side from its rear end. The third hook part may be positioned on one side of the movable shaft 38.

Additionally, the third extension part 303*a* may also be inclined so that its front end is positioned on one side from its rear end.

Referring to FIGS. 1 and 5, the hose h connected to communicate with the second opening may have an inlet placed in a vertical direction when not in use (the inlet is based on the direction of flow of water in the hose h, water flows from the inlet to the outlet in the hose h, and the inlet has an end connected to communicate with the second opening).

Referring to FIG. 5, the transmission piece 39 is intended to rotate counterclockwise around the movable shaft 38 so that the rear end of the latching part 391 is directed to the other side by the elastic restoring force of the third torsion spring 30. Here, the elastic restoring force refers to the force that pulls from the front end of one side to the rear end of the other side of the transmission piece 39 by the third hook part.

In this case, the inclined part (371*ab*) (see FIG. 6 described below) of the vertical part 371 restricts the transmission piece 39 from rotating counterclockwise about the movable shaft 38, as illustrated in FIG. 5.

Figure 6:
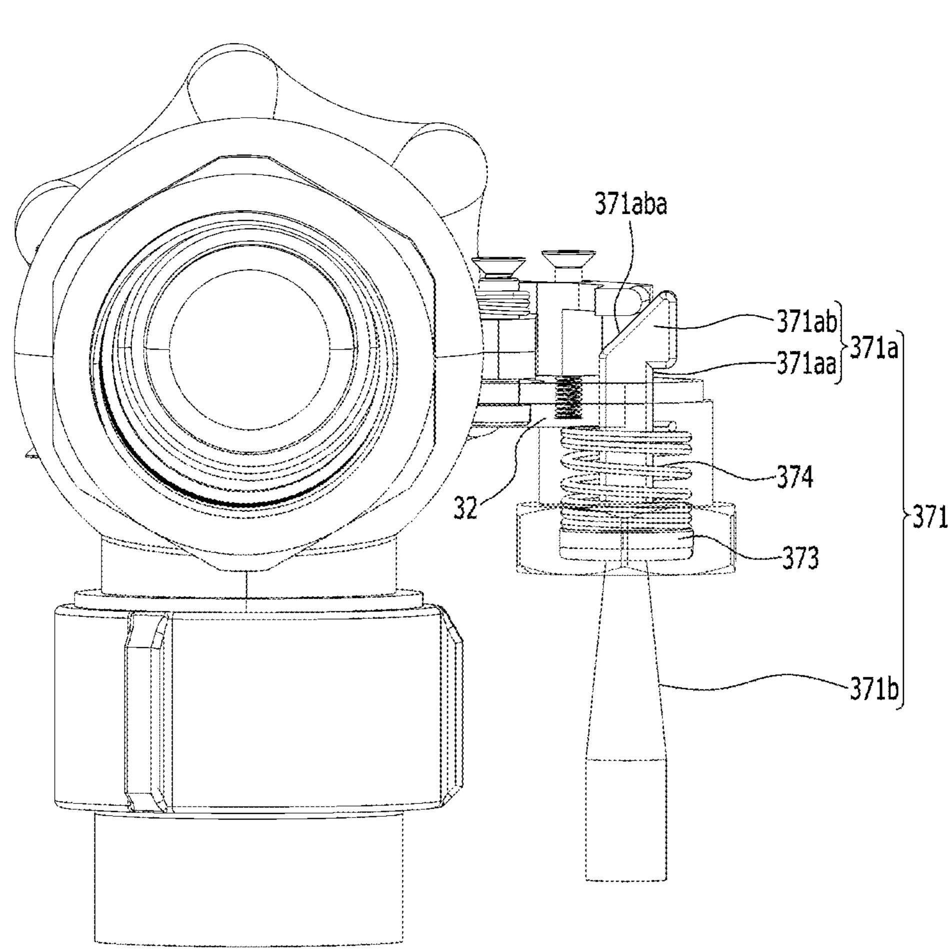
FIG. 6 is a side view of the valve convenient for use in explaining a tilting member.

Meanwhile, referring to FIG. 6, the vertical part 371 may include an upper member 371*a* and a lower member 371*b* placed at the bottom of the upper member 371*a* and detachably coupled to the upper member 371*a*. In addition, the upper member 371*a* may include a straight part 371*aa* with a constant width in a vertical direction, and an inclined part 371*ab* provided on the upper portion of the straight part 371*aa* and having an inclined surface 371*aba* on one side thereof to have a width decreased toward the upper side thereof.

The upper member 371*a* and the lower member 371*b* may be detachably coupled to each other by a detachable coupling unit that includes a screw rod protruding upwards from the lower member 371*b* and a screw groove recessed upwards from the lower surface of the upper member 371*a* and fastened to the screw rod.

This can improve the maintainability of the upper member 371*a* and the lower member 371*b*.

Referring to FIG. 1, if a user of this device moves the outlet of the hose h to use the hose h, the inlet of the hose h is tilted against the vertical direction, and the connection part 372 connected to the hose h moves so that the vertical part 371 is tilted against the vertical direction, centered on the portion penetrating the base 32.

As described above, the base 32 is placed forwards on the other side from the second opening. Therefore, if the lower portion of the inlet of the hose h moves forwards, the lower portion of the vertical part 371 is moved forwards by the connection part 372 so that the portion of the vertical part 371 exposed to the upper portion of the base 32 moves backwards.

Accordingly, since the latching part 391 is not latched on the inclined part 371*ab*, the transmission piece 39 may rotate counterclockwise about the movable shaft 38 (as described above, the transmission piece 39 is intended to rotate counterclockwise by the third torsion spring 30.

As described above, the end of the insertion part 392 of the transmission piece 39 is inserted into the groove 341*a*. The edge of the insertion part 382, which is formed by one end surface thereof and the rear surface connected to one end surface, is inserted into the groove 341*a*, and the groove 341*a* is provided in the form of a sloped side so as to have a width decreased toward its bottom from its opening. Accordingly, as the insertion part 392 rotates counterclockwise, the end of the insertion part 392 pushes the side of the groove 341*a*, thereby transmitting power so that the latching member 34 rotates clockwise about the shaft member 33.

Accordingly, according to the principle described above, the front part 343 may rotate clockwise about the shaft member 33 so that the moving shaft 42 rotates counterclockwise about the main shaft 41, and the rod 21 may move forwards so that the disk 22 opens the first opening 11.

This has an advantage in that the first opening of this device may be opened simply by moving the hose, even if it is necessary to supply water to a location far from the place where this device is installed. In other words, this means that there is no need for one person to carry the hose and another to open the valve.

Referring to FIGS. 5 and 6, as described above, the inclined part 371*ab* may include a stepped surface extending to the other side from the upper side of the other end of the straight part 371*aa*, a vertical surface extending upwards from the other end of the stepped surface, and an inclined surface 371*aba* connecting the vertical surface to the upper side of one end of the straight part 371*aa*.

In other words, the inclined surface 371*aba* is inclined upwards to the other side. In addition, the other side of the latching part 391 may be a curved surface. This allows the first opening 11 to be opened likewise, since the transmission piece 39 may rotate counterclockwise about the movable shaft 38 even if the tilting member 37 is tilted against the vertical direction such that the inclined part 371*ab* moves to the other side. In other words, the first opening 11 may be opened even if the outlet of the hose h is moved to the other side.

After use, the latching shaft 35 may be inserted into the latching groove 344, the upper plate and the lower plate of the plate 43 may be separated from each other, and the latching part 391 of the transmission piece 39 may then be positioned on one side from the other end of the inclined part 371*ab* to prepare for reuse.

Referring to FIG. 6, the tilting member 37 may include a support 373 extending radially on the upper circumference of the lower member 371*b*, and an elastic body 374 having an upper portion supporting the lower portion of the base 32 and a lower portion supported by the support 373.

This has an advantage in that the elastic body 374 connected to the lower portion of the base 32 may prevent the upward movement of the lower member 371*b* by the hose h or the like, and the elastic body 374 may absorb a load, thereby preventing damage to the transmission piece 39 or the like due to the upward movement of the inclined part 371*ab*.

Referring to FIG. 1, the connection part 372 may include a ring part 372*b* that is open at one side thereof while surrounding the hose h, and a transmission part 372*a* connected at the bottom thereof to the ring part 372*b* and connected to the bottom of the vertical part 371.

Figure 7:
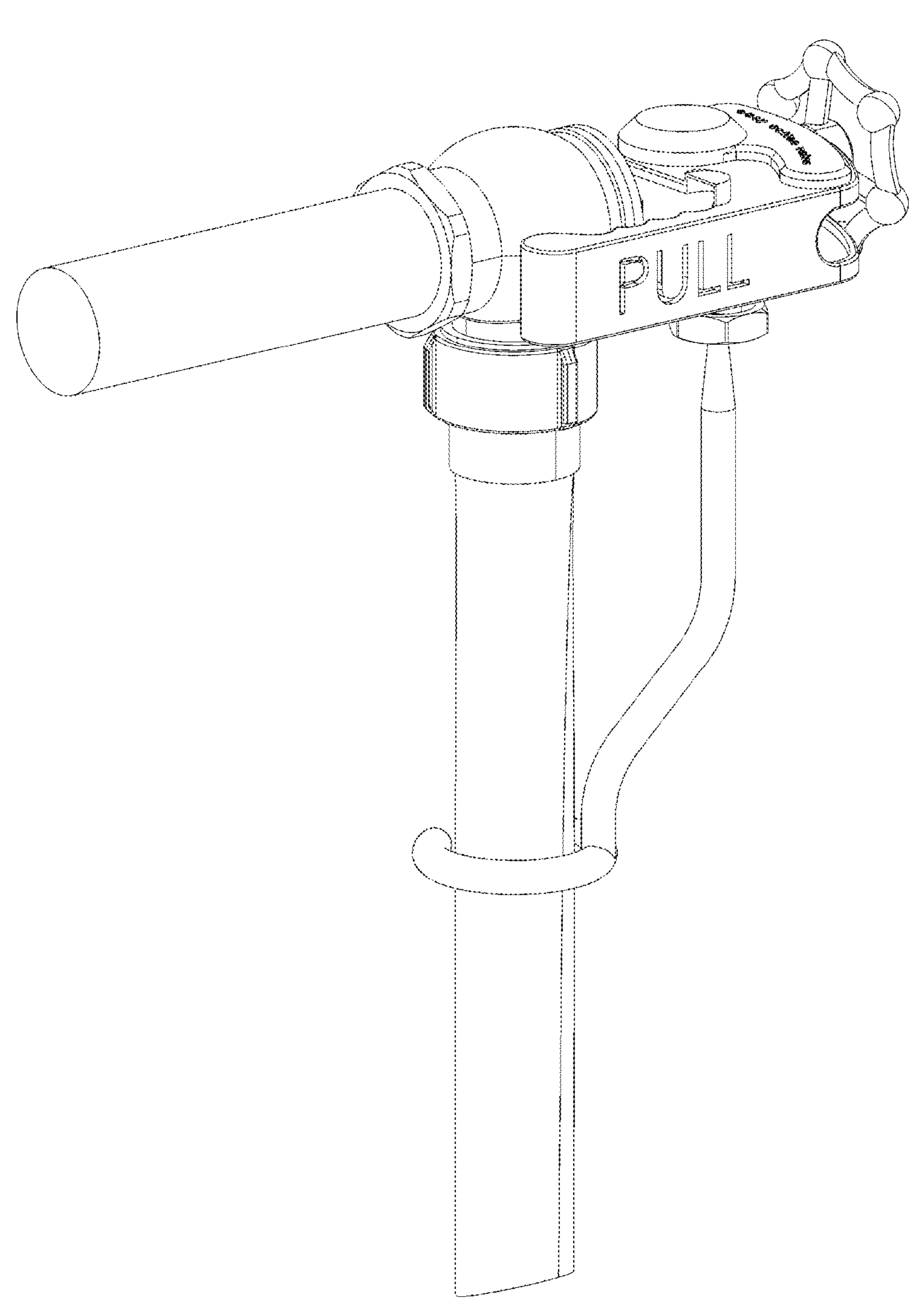
FIG. 7 is a view for explaining the fire hydrant valve with a cover connected to the upper portion of the upper plate.

FIG. 7 is a view for explaining the fire hydrant valve with a cover connected to the upper portion of the upper plate.

Referring to FIG. 7, the cover may be connected to the upper portion of the upper plate. The upper plate and the cover may be detachably coupled to each other, for example, by means of fitting, bolts, or the like.

With the cover connected to the upper portion of the upper plate, the cover may cover the guide hole 44, thereby preventing fingers or the like from getting stuck in the guide hole 44.

The cover may also prevent water or the like from leaking onto the upper plate.

The cover is connected only to the upper plate, not to the lower portion of the lower plate, allowing water to drain to the outside through the lower plate.

Figure 8:
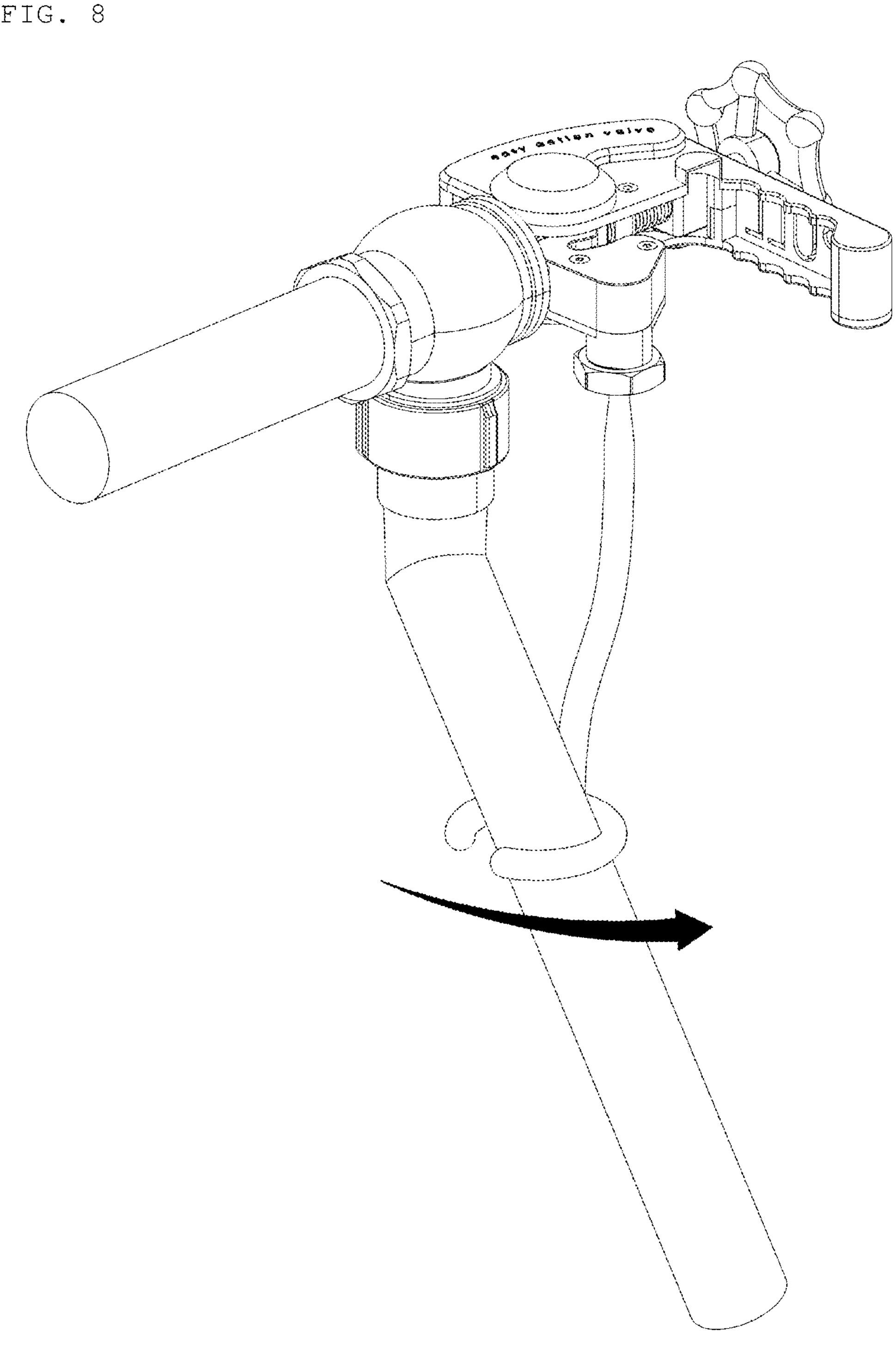
FIG. 8 is a view for explaining a state in which the fire hydrant valve is opened by the first movement unit in FIG. 7.
Figure 9:
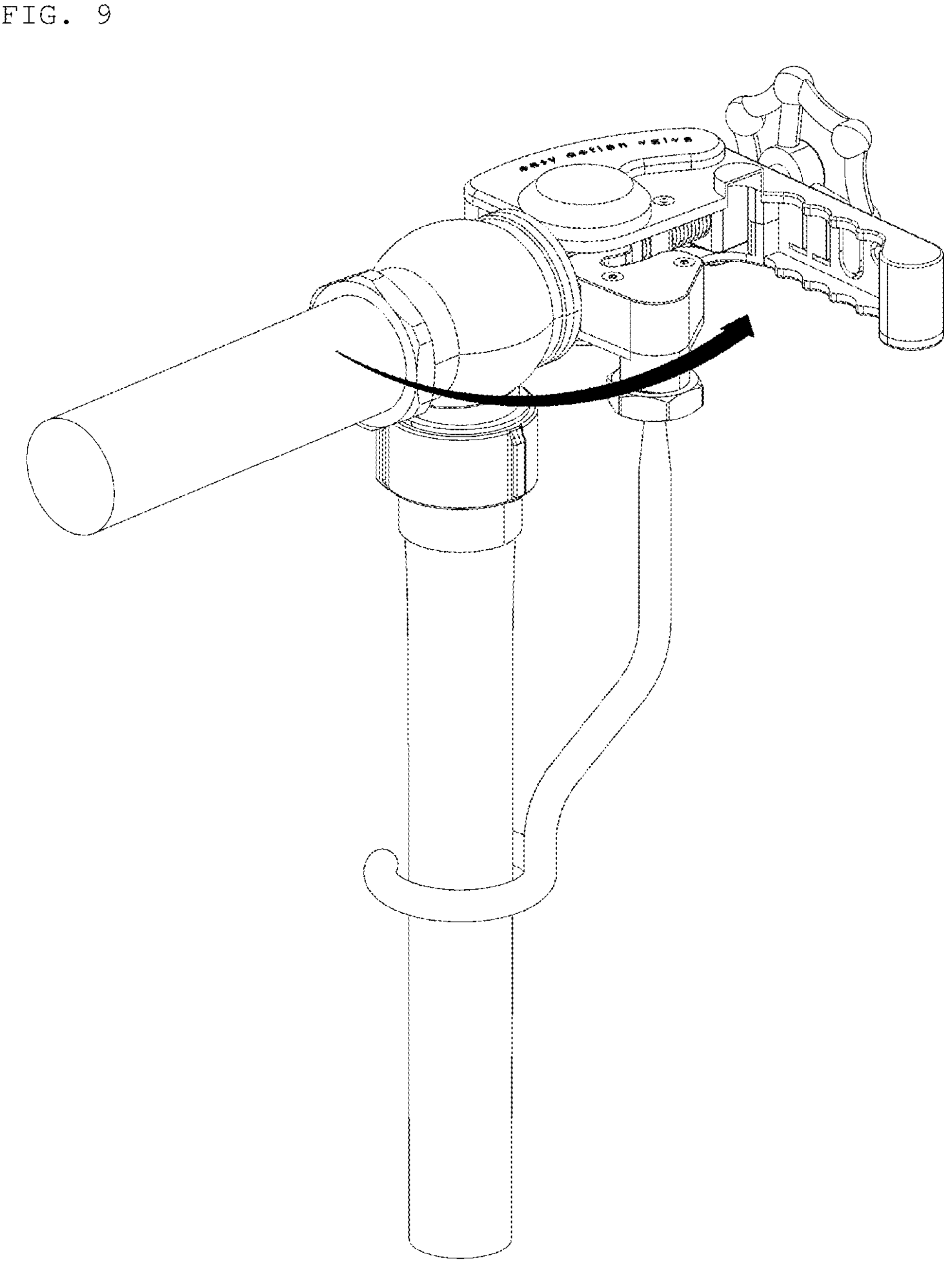
FIG. 9 is a view for explaining a state in which the fire hydrant valve is opened by the second movement unit in FIG. 7.
Figure 10:
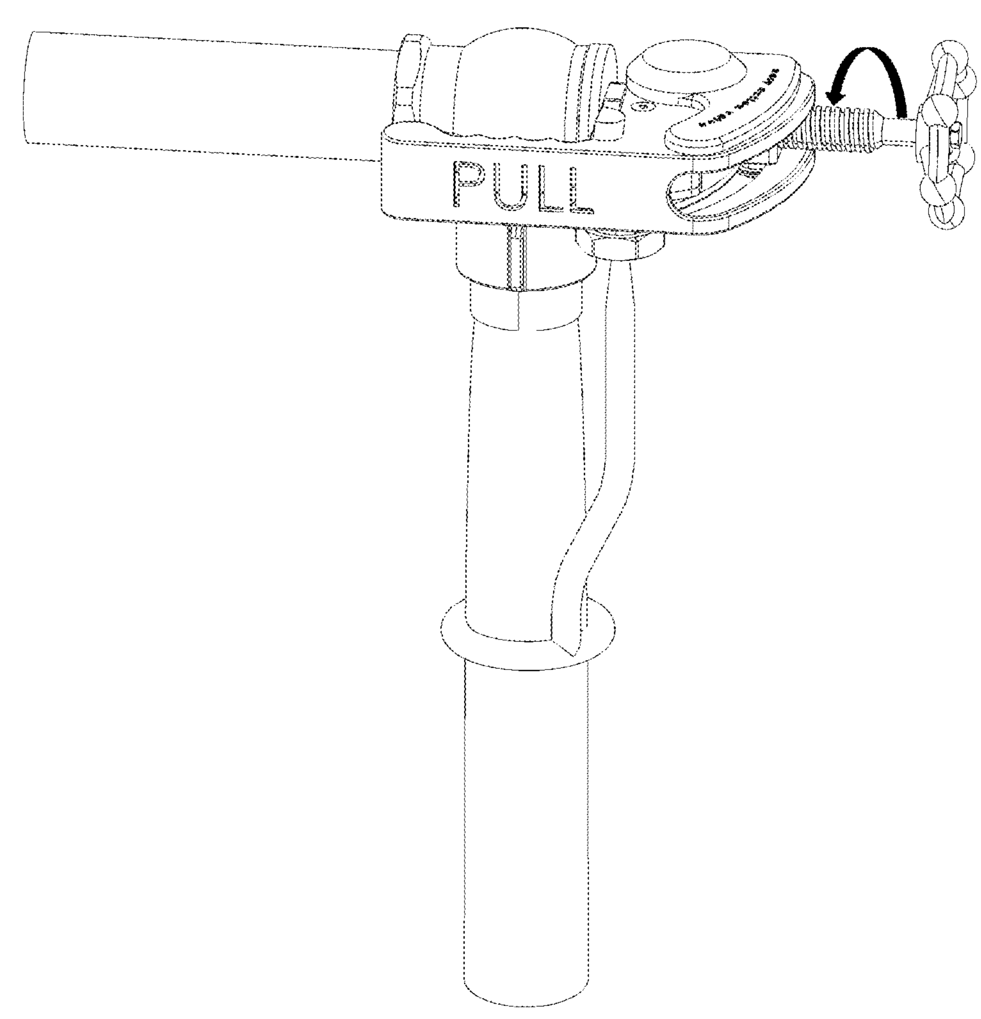
FIG. 10 is a view for explaining a state in which the fire hydrant valve is opened by turning a handle in FIG. 7.

FIG. 8 is a view for explaining a state in which the fire hydrant valve is opened by the first movement unit in FIG. 7. FIG. 9 is a view for explaining a state in which the fire hydrant valve is opened by the second movement unit in FIG. 7. FIG. 10 is a view for explaining a state in which the fire hydrant valve is opened by turning the handle in FIG. 7.

FIG. 8 illustrates a state in which this device is opened by moving the first movement unit 3 with the hose h. FIG. 9 illustrates a state in which this device is opened by pivoting the second movement unit 4 with the grip 45. FIG. 10 illustrates a state in which this device is opened by turning the handle 24.

The present disclosure described above with reference to the attached drawings can be modified and changed in various ways by those skilled in the art, and such modifications and changes should be interpreted as falling within the scope of the present disclosure.

The invention claimed is:

1. A fire hydrant valve comprising:

a body formed with a first opening and a second opening;

a switching unit comprising a rod configured to penetrate the body, and a disk provided at an end of the rod to open and close the first opening;

a first movement unit connected to the rod and a hose connected to the second opening and configured to move the rod in response to movement of the hose; and a second movement unit, which comprises a main shaft connected to the body, a moving shaft connected to the rod and placed in front of the main shaft, a plate coupled to the main shaft to rotate about the main shaft, and a guide hole formed on the plate in a direction of rotation thereof for penetration of the moving shaft through the plate, wherein the first movement unit comprises:

a first torsion spring, which comprises a first coil surrounding the main shaft and a first arm connected to the plate by extending from an end of the first coil;

a base connected to the body;

a shaft member provided on the base;

a latching member, which comprises a body part placed on the base to rotate about the shaft member configured to penetrate the body part, a rear part extending to one side from the rear of the body part, a front part extending to one side from the front of the body part, and a latching groove formed by the body part, the rear part, and the front part;

a latching shaft provided on the plate and inserted into the latching groove; and a second torsion spring, which comprises a second coil surrounding the shaft member, a second support arm comprising a second straight part extending backwards from one of both ends of the second coil and a second hook part connected to the base by extending downwards from a rear end of the second straight part and configured to support a rear end of the rear part, and a second fixed arm fixed to the base by extending from the other of both ends of the second coil.

2. The fire hydrant valve according to claim 1, wherein the first movement unit comprises:

a groove formed at a front end of the body part;

a tilting member, which comprises a vertical part penetrating the base and a connection part connected to the hose while being connected to the bottom of the vertical part;

a movable shaft provided on the base and placed forwards on the other side from the shaft member;

a transmission piece, which comprises a latching part placed at an upper portion of the base and positioned on one side from the vertical part, and an insertion part extending forwards from a front end of the latching part and bent or curved to one side to insert its end into the groove, the movable shaft penetrating the insertion part; and a third torsion spring, which comprises a third coil surrounding the movable shaft, a third support arm comprising a third straight part extending forwards from one of both ends of the third coil and a third hook part connected to the base by extending downwards from a rear end of the third straight part and configured to support the front of one side of the insertion part, and a third fixed arm fixed to the base by extending from the other of both ends of the third coil.

* * * * *